United States Patent
Sasata et al.

(10) Patent No.: US 9,751,999 B2
(45) Date of Patent: Sep. 5, 2017

(54) POLARIZING PLATE PROTECTIVE FILM, DOPE COMPOSITION, METHOD FOR MANUFACTURING POLARIZING PLATE PROTECTIVE FILM, POLARIZING PLATE, AND LIQUID CRYSTAL DISPLAY DEVICE

(71) Applicant: FUJIFILM Corporation, Tokyo (JP)

(72) Inventors: Katsumi Sasata, Kanagawa (JP); Hajime Nakayama, Kanagawa (JP); Shusuke Arita, Kanagawa (JP); Yutaka Nozoe, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 15/138,754

(22) Filed: Apr. 26, 2016

(65) Prior Publication Data

US 2016/0237230 A1 Aug. 18, 2016

Related U.S. Application Data

(63) Continuation of application No. PCT/JP2014/079022, filed on Oct. 31, 2014.

(30) Foreign Application Priority Data

Nov. 1, 2013 (JP) ................. 2013-228733

(51) Int. Cl.
| | |
|---|---|
| *C08J 5/18* | (2006.01) |
| *B29C 41/02* | (2006.01) |
| *B29C 55/00* | (2006.01) |
| *C08L 33/12* | (2006.01) |
| *C08F 220/14* | (2006.01) |
| *G02B 5/30* | (2006.01) |
| *G02B 1/14* | (2015.01) |
| *B29C 41/00* | (2006.01) |
| *B29C 55/14* | (2006.01) |
| *B29C 69/00* | (2006.01) |
| *B29D 7/01* | (2006.01) |
| *G02F 1/1335* | (2006.01) |
| *B29K 33/00* | (2006.01) |
| *B29K 105/00* | (2006.01) |
| *B29K 105/16* | (2006.01) |

(52) U.S. Cl.
CPC ............... *C08J 5/18* (2013.01); *B29C 41/003* (2013.01); *B29C 41/02* (2013.01); *B29C 55/005* (2013.01); *B29C 55/143* (2013.01); *B29C 69/00* (2013.01); *B29D 7/01* (2013.01); *C08F 220/14* (2013.01); *C08L 33/12* (2013.01); *G02B 1/14* (2015.01); *G02B 5/3033* (2013.01); *B29K 2033/12* (2013.01); *B29K 2105/0058* (2013.01); *B29K 2105/16* (2013.01); *B29K 2105/256* (2013.01); *B29K 2995/0017* (2013.01); *C08J 2333/12* (2013.01); *G02F 1/133528* (2013.01)

(58) Field of Classification Search
CPC ..... B29C 41/003; B29C 41/02; B29C 55/005; B29C 55/143; B29C 7/01; B29C 69/00
See application file for complete search history.

(56) References Cited

U.S. PATENT DOCUMENTS

| | | | | |
|---|---|---|---|---|
| 2007/0243364 | A1* | 10/2007 | Maekawa ............. | C08L 33/064 428/220 |
| 2010/0292368 | A1 | 11/2010 | Takebe et al. | |
| 2014/0000801 | A1* | 1/2014 | Seo .................... | B29D 11/0073 156/246 |
| 2014/0036363 | A1* | 2/2014 | Seo .......................... | G02B 1/04 359/489.07 |

FOREIGN PATENT DOCUMENTS

| | | |
|---|---|---|
| JP | S61-252211 A | 11/1986 |
| JP | 2007-118266 A | 5/2007 |
| JP | 2007-223056 A | 9/2007 |
| WO | 2009/096070 A1 | 8/2009 |
| WO | 2010/116830 A1 | 10/2010 |
| WO | 2011/045991 A1 | 4/2011 |

OTHER PUBLICATIONS

International Preliminary Report on Patentability issued by WIPO on May 12, 2016, in connection with International Patent Application No. PCT/JP2014/079022.
Notification of Reasons for Refusal Issued by the Japanese Patent Office on Apr. 4, 2017, in connection with Japanese Patent Application No. 2015-545319.
International Search Report issued in connection with International Patent Application No. PCT/JP2014/079022 on Jan. 20, 2015.
Written Opinion issued in connection with International Patent Application No. PCT/JP2014/079022 on Jan. 20, 2015.

* cited by examiner

*Primary Examiner* — Robert Harlan
(74) *Attorney, Agent, or Firm* — Edwards Neils LLC; Jean C. Edwards, Esq.

(57) ABSTRACT

A polarizing plate protective film containing an acrylic resin, in which the acrylic resin includes a methyl methacrylate unit a, a mass fraction of an alkyl (meth)acrylate unit b other than methyl methacrylate is less than 5 mass %, a weight average molecular weight is 250,000 to 4,000,000, and a weight decreasing amount at the time of being heated at 140° C. for 1 hour is less than or equal to 0.5%, has excellent heat resistance and an excellent surface shape; a dope composition; a method for manufacturing a polarizing plate protective film; a polarizing plate; and a liquid crystal display device.

14 Claims, 2 Drawing Sheets

FIG. 1

FIG. 2

POLARIZING PLATE PROTECTIVE FILM, DOPE COMPOSITION, METHOD FOR MANUFACTURING POLARIZING PLATE PROTECTIVE FILM, POLARIZING PLATE, AND LIQUID CRYSTAL DISPLAY DEVICE

CROSS-REFERENCE TO RELATED APPLICATIONS

This application is a Continuation of PCT International Application No. PCT/JP2014/079022, filed on Oct. 31, 2014, which was published under PCT Article 21(2) in Japanese, and claims priority under 35 U.S.C. Section 119(a) to Japanese Patent Application No. 2013-228733 filed on Nov. 1, 2013. The above applications are hereby expressly incorporated by reference, in their entirety, into the present application.

BACKGROUND OF THE INVENTION

1. Field of the Invention

The present invention relates to a polarizing plate protective film, a dope composition, a method for manufacturing a polarizing plate protective film, a polarizing plate, and a liquid crystal display device.

2. Description of the Related Art

A demand for using a liquid crystal display device as a liquid crystal display or the like of a liquid crystal television or a personal computer has increased. In general, a liquid crystal display device is configured of a liquid crystal cell in which a transparent electrode, a liquid crystal layer, a color filter, and the like are interposed between glass plates, and two polarizing plates disposed on both sides thereof, and each of the polarizing plates has a configuration in which a polarizer (also referred to as a polarizing film) is interposed between two optical films (polarizing plate protective films). In general, a cellulose triacetate film is used as the polarizing plate protective film.

On the other hand, the size of the liquid crystal display device has been rapidly enlarged, and the application of the liquid crystal display device has been diversified according to advancements in the recent technology. For example, the liquid crystal display device is used as a large display which is disposed on the street or in front of a store, a display for advertisement in a public place using a display device which is referred to as digital signage, and the like.

In such application, the liquid crystal display device is assumed to be used outside, and thus, deterioration due to moisture absorption of the polarizing film becomes a problem, and the polarizing plate protective film has been required to have higher moisture resistance. However, in a cellulose ester film such as a cellulose triacetate film which has been used in the related art, it is difficult to obtain sufficient moisture resistance, and recently, a device has been required to be thin, and thus, in a case where the film becomes thick in order to obtain moisture resistance, the polarizing plate itself also becomes thick.

On the other hand, polymethyl methacrylate (hereinafter, referred to as PMMA) which is a representative of an acrylic resin exhibits excellent transparency or excellent dimensional stability in addition to low hygroscopicity, and thus, has been preferably used as an optical film material having low hygroscopicity in the optical film.

For example, in JP2007-118266A, it is disclosed that an acrylic resin having a molecular weight of 80,000 to 150,000 is preferably used as the material of a polarizing plate protective film, and in JP2007-118266A, it is also disclosed that an acrylic resin film is formed by a solution film formation method.

SUMMARY OF THE INVENTION

However, the present inventors have performed actual evaluation with respect to a polarizing plate protective film using the acrylic resin of the related art, and thus, have found that the polarizing plate protective film has insufficient heat resistance, the polarizing plate protective film was deformed in a case of being left to stand under a high temperature environment such as the inside of a vehicle in summer, and a polarizing plate and the entire panel warped according to the deformation. In addition, even in a manufacturing step thereof, it is necessary to set an acrylic resin solution to have a comparatively high concentration in order to subject to solution film formation in an acrylic resin having a comparatively low molecular weight of 80,000 to 150,000, and in this case, it was obvious that streaks occurred on the surface of a casting film at the time of being ejected from a casting die, and step-like unevenness also occurred on the surface of a film to be obtained.

Therefore, in order to solve the problems of the related art, the present inventors have conducted studies for providing a polarizing plate protective film having excellent heat resistance and an excellent surface shape. Further, the present inventors have conducted studies for providing a method for manufacturing a polarizing plate protective film with high productivity, a dope composition used therein, and a polarizing plate and a liquid crystal display device comprising the polarizing plate protective film.

As a result of conducting intensive studies for attaining the objects described above, the present inventors have found that a polarizing plate protective film having excellent heat resistance and an excellent surface shape is able to be obtained by using an acrylic resin which has a weight average molecular weight of 250,000 to 4,000,000, and includes a methyl methacrylate unit (a) as a main body, and by regulating a weight decreasing amount at the time of being heated at 140° C. for 1 hour to be less than or equal to 0.5%. Specifically, the present invention has the following configurations.

[1] A polarizing plate protective film containing an acrylic resin, in which the acrylic resin includes a methyl methacrylate unit a, a mass fraction of an alkyl (meth)acrylate unit b other than methyl methacrylate is less than 5 mass %, a weight average molecular weight is 250,000 to 4,000,000, and a weight decreasing amount at the time of being heated at 140° C. for 1 hour is less than or equal to 0.5%.

[2] The polarizing plate protective film according to [1], in which the acrylic resin is formed of an alkyl (meth)acrylate unit, and a mass fraction of the methyl methacrylate unit a is greater than or equal to 95 mass %.

[3] The polarizing plate protective film according to [1] or [2], in which the number of times of folding endurance which is measured on the basis of JIS P8115 in conditions of a load of 100 g is greater than or equal to 30 times in both of a longitudinal direction and a width direction of a film.

[4] The polarizing plate protective film according to any one of [1] to [3], in which the weight average molecular weight of the acrylic resin is 600,000 to 4,000,000.

[5] The polarizing plate protective film according to any one of [1] to [4], in which the weight decreasing amount at the time of being heated at 140° C. for 1 hour is less than or equal to 0.2%.

[6] A dope composition containing an acrylic resin, in which the acrylic resin includes a methyl methacrylate unit a, a mass fraction of an alkyl (meth)acrylate unit b other than methyl methacrylate is less than 5 mass %, a weight average molecular weight is 250,000 to 4,000,000, and a weight decreasing amount at the time of being heated at 140° C. for 1 hour is less than or equal to 0.5%.

[7] The dope composition according to [6], in which the acrylic resin is formed of an alkyl (meth)acrylate unit, and a mass fraction of the methyl methacrylate unit a is greater than or equal to 95 mass %.

[8] The dope composition according to [7], in which the weight average molecular weight of the acrylic resin is 600,000 to 4,000,000.

[9] A method for manufacturing a polarizing plate protective film comprising a film forming step of forming a film by casting a solution in which an acrylic resin is dissolved in a solvent onto a support and by drying the solution, and of peeling off the film; a first stretching step of stretching the film in a longitudinal direction; and a second stretching step of stretching the film in a width direction, in which the acrylic resin includes a methyl methacrylate unit a, a mass fraction of an alkyl (meth)acrylate unit b other than methyl methacrylate is less than 5 mass %, a weight average molecular weight is 250,000 to 4,000,000, a weight decreasing amount at the time of being heated at 140° C. for 1 hour is less than or equal to 0.5%, when a residual volatile content of the film is set to A1 and a surface temperature of the film is set to T1 in the first stretching step, and a residual volatile content of the film is set to A2 and a surface temperature of the film is set to T2 in the second stretching step, conditions of Expressions (1) and (2) described below are satisfied, and the unit of A1 and A2 is %, and the unit of T1 and T2 is ° C.

$$T1 \leq 170 - 2.8A1 \quad \text{Expression (1)}$$

$$T2 \leq 170 - 2.8A2 \quad \text{Expression (2)}$$

[10] The method for manufacturing a polarizing plate protective film according to [9], in which the residual volatile content A1 of the film and the surface temperature T1 of the film in the first stretching step satisfy conditions of Expression (3) described below, the residual volatile content A2 of the film and the surface temperature T2 of the film in the second stretching step satisfy conditions of Expression (4) described below, and the unit of A1 and A2 is %, and the unit of T1 and T2 is ° C.

$$100 - 3.2A1 \leq T1 \quad \text{Expression (3)}$$

$$100 - 3.2A2 \leq T2 \quad \text{Expression (4)}$$

[11] The method for manufacturing a polarizing plate protective film according to [9] or [10], in which both of a stretching ratio in the first stretching step and a stretching ratio in the second stretching step are 130% to 180%.

[12] The method for manufacturing a polarizing plate protective film according to any one of [9] to [1], in which the residual volatile content of the film in the first stretching step is 10% to 30%, and the residual volatile content of the film in the second stretching step is less than or equal to 10%.

[13] A polarizing plate comprising the polarizing plate protective film according to any one of [1] to [5].

[14] A liquid crystal display device comprising the polarizing plate according to [13].

According to the polarizing plate protective film and the method for manufacturing thereof of the present invention, it is possible to efficiently obtain a polarizing plate protective film having excellent heat resistance and an excellent surface shape.

In addition, according to the polarizing plate and the liquid crystal display device of the present invention, warping rarely occurs even under a high temperature environment, excellent display properties are able to be obtained, and high productivity is able to be obtained by using the polarizing plate protective film of the present invention.

DESCRIPTION OF THE PREFERRED EMBODIMENTS

Hereinafter, the present invention will be described in detail. The description of configuration requirements described below is based on representative embodiments or specific examples, but the present invention is not limited to the embodiments. Further, herein, a numerical range denoted by using "to" indicates a range including numerical values before and after "to" as the lower limit value and the upper limit value. In addition, (meth)acryl indicates methacryl or acryl. An acrylic resin used in the present invention indicates a (meth)acrylic resin, and also includes a methacryl resin.

<<Polarizing Plate Protective Film>>

A polarizing plate protective film of the present invention contains an acrylic resin, and the acrylic resin includes a methyl methacrylate unit (a), a mass fraction of an alkyl (meth)acrylate unit (b) other than methyl methacrylate is less than 5 mass %, a weight average molecular weight is 250,000 to 4,000,000, and a weight decreasing amount at the time of being heated at 140° C. for 1 hour is less than or equal to 0.5%. The weight average molecular weight of the acrylic resin in such a range is higher than the weight average molecular weight of an acrylic resin used in melting film formation, and thus, is suitable for melting film formation.

The polarizing plate protective film of the present invention contains such an acrylic resin, and thus, excellent heat resistance and an excellent surface shape are able to be obtained. Hereinafter, each configuration will be described.

<Acrylic Resin>

[Configuration Unit of Acrylic Resin] The acrylic resin used in the present invention includes the methyl methacrylate unit (a), and may be configured only of the methyl methacrylate unit (a), or may include the alkyl (meth)acrylate unit (b) other than the methyl methacrylate. Here, in a case where the acrylic resin includes the alkyl (meth)acrylate unit (b) other than the methyl methacrylate, a ratio thereof is less than 5 mass %. The acrylic resin used in the present invention may be a homopolymer of the methyl methacrylate without using other copolymerizable monomers.

In a case where the acrylate resin includes the alkyl (meth)acrylate unit (b) other than the methyl methacrylate, examples of the alkyl (meth)acrylate unit (b) include the following.

(Alkyl (Meth)Acrylate Unit (b) Other than Methyl Methacrylate)

Examples of the alkyl (meth)acrylate unit (b) other than the methyl methacrylate include acrylic acid ester (preferably alkyl acrylate in which alkyl has 1 to 18 carbon atoms) such as methyl acrylate, ethyl acrylate, n-butyl acrylate, isobutyl acrylate, t-butyl acrylate, 2-ethyl hexyl acrylate, cyclohexyl acrylate, and benzyl acrylate; methacrylic acid ester (preferably alkyl methacrylate in which alkyl has 2 to 18 carbon atoms) such as ethyl methacrylate, propyl methacrylate, n-butyl methacrylate, isobutyl methacrylate, t-butyl methacrylate, cyclohexyl methacrylate, and benzyl methacrylate; and the like, and only one type of the alkyl (meth)acrylate unit (b) may be used, or two or more types thereof may be used in combination.

(Other Configuration Units)

The acrylic resin used in the present invention may also include a configuration unit other than the alkyl (meth) acrylate units (a) and (b). Examples of the configuration unit include an $\alpha,\beta$-unsaturated acid such as an acrylic acid and a methacrylic acid, an unsaturated group-containing divalent carboxylic acid such as a maleic acid, a fumaric acid, and an itaconic acid, an aromatic vinyl compound such as styrene and $\alpha$-methyl styrene, $\alpha,\beta$-unsaturated nitrile such as acrylonitrile and methacrylonitrile, maleic anhydride, maleimide, N-substituted maleimide, glutaric anhydride, and the like. On the other hand, other configuration units do not include a cellulose-based resin.

Only one type of the configuration unit may be independently introduced into the acrylic resin, and two or more types thereof may be introduced into the acrylic resin in combination.

Among them, from the viewpoint of thermal decomposition resistance or fluidity of a copolymer, methyl acrylate, ethyl acrylate, n-propyl acrylate, n-butyl acrylate, s-butyl acrylate, 2-ethyl hexyl acrylate, and the like are preferable, and the methyl acrylate or the n-butyl acrylate is particularly preferably used.

(Mass Fraction of Methyl Methacrylate Unit (a))

It is most preferable that the acrylic resin is configured only of the methyl methacrylate unit (a) from the viewpoint of increasing a glass transition temperature and of obtaining heat resistance. On the other hand, in a case where the acrylic resin is set to a copolymer of the methyl methacrylate unit (a) and the other configuration unit, properties other than the properties exhibited by the methyl methacrylate unit (a) are able to be imparted to the acrylic resin.

In the acrylic resin described above, a content ratio of methyl methacrylate in a monomer component provided to a polymerization step is preferably 95 mass % to 100 mass %, is more preferably 97 mass % to 100 mass %, and is even more preferably 100 mass %, from the viewpoint of sufficiently exhibiting the effect of the present invention.

By setting the ratio of the methyl methacrylate to be greater than or equal to 95 mass %, an acrylic resin having high heat resistance is able to be obtained, and heat resistance of the polarizing plate protective film of the present invention is able to be high.

In addition, the acrylic resin described above includes the methyl methacrylate unit (a), and the mass fraction of the alkyl (meth)acrylate unit (b) other than the methyl methacrylate is preferably less than 5 mass %, is more preferably less than 3 mass %, and is particularly preferably 0 mass %.

(Method for Manufacturing Acrylic Resin)

The acrylic resin which is able to be used in the present invention is available by a commercially available product or a known synthesis method.

Emulsion polymerization, solution polymerization, bulk polymerization, and suspension polymerization are able to be applied as a method for manufacturing the acrylic resin which is able to be used in the present invention. Among them, the emulsion polymerization and the suspension polymerization are more preferable from the viewpoint of manufacturing a polymer of the present invention.

An initiator which is used in general suspension polymerization is able to be used as an initiator of the suspension polymerization, and examples of the initiator include an organic peroxide and an azo compound.

A known suspension stabilizer which is generally used is also able to be used as a suspension stabilizer, and examples of the suspension stabilizer are able to include an organic colloidal polymer substance, an inorganic colloidal polymer substance, inorganic fine particles, and a combination of the substances and a surfactant.

Here, the acrylic resin used in the present invention includes the methyl methacrylate unit (a), the mass fraction of the alkyl (meth)acrylate unit (b) other than the methyl methacrylate is less than 5 mass %, the weight average molecular weight is 250,000 to 4,000,000, and the weight decreasing amount at the time of being heated at 140° C. for 1 hour is less than or equal to 0.5%. In the acrylic resin having a composition of such a structure unit, it is particularly preferable that the following methods are performed at the time of synthesizing the acrylic resin in order to make a high weight average molecular weight and suppression in a weight decreasing amount compatible.

Examples of a method which is preferably performed at the time of synthesizing the acrylic resin are able to include a method in which a reaction liquid is filtered by filter cloth in a state of a suspension liquid after obtaining the acrylic resin by a polymerization reaction, and a filtrate is dried after being washed with methanol. Examples of the filter cloth are able to include nylon filter cloth. The reaction liquid is not dried as it is after obtaining the acrylic resin by the polymerization reaction, and thus, an excessive polymerization initiator or the like is able to be removed, and an acrylic resin is able to be obtained in which a high weight average molecular weight and suppression in a weight decreasing amount are compatible with each other.

[Weight Average Molecular Weight of Acrylic Resin]

In the present invention, the "weight average molecular weight" is a weight average molecular weight measured by gel chromatography.

The weight average molecular weight of the acrylic resin is 250,000 to 4,000,000, is preferably 600,000 to 4,000,000, is more preferably 800,000 to 3,000,000, and is even more preferably 1,000,000 to 2,000,000. By setting the weight average molecular weight of the acrylic resin to be greater than or equal to 250,000, for example, in a case where the polarizing plate protective film is manufactured by a solution film formation method, a solution (a dope) having comparatively high viscosity is able to be obtained even in a case of setting the concentration of the acrylic resin to be low. As a result thereof, the occurrence of streaks on the surface is suppressed at the time of ejecting the dope from a casting die, and thus, it is possible to obtain a film having an excellent surface shape. In addition, by setting a resin concentration of the dope to be low (by increasing a ratio of a solvent), a solvent component remains on the film after being dried, and thus, an effect is able to be obtained in which the film is able to be easily peeled off from a support. On the other hand, by setting the weight average molecular weight of the acrylic resin to be less than or equal to 4,000,000, a merit is obtained in which the acrylic resin is easily synthesized or easily becomes available.

Here, a "weight average molecular weight (Mw)" in the present invention is able to be measured in conditions described in [Measurement Method] of Examples. Specifically, the conditions are as follows.

The weight average molecular weight is a weight average molecular weight measured in the following conditions by gel chromatography.

| | |
|---|---|
| Solvent | Tetrahydrofuran |
| Device Name | TOSOH HLC-8220GPC |
| Column | Using Three TOSOH TSK Gel Super HZM-H (4.6 mm × 15 cm) in Connection. |
| Column Temperature | 25° C. |
| Sample Concentration | 0.1 mass % |
| Flow Rate | 0.35 ml/min |
| Calibration Curve | TSK Standard Polystyrene Manufactured by Tosoh Corporation, Using Calibration Curve of Seven Samples Having Mw of 2,800,000 to 10,500,000. |

[Weight Decreasing Amount at the Time of Heating Acrylic Resin at 140° C. for 1 Hour]

Herein, the "weight decreasing amount at the time of heating the acrylic resin at 140° C. for 1 hour" is a mass decreasing rate (unit %) of the acrylic resin before and after being heated at the time of heating the acrylic resin at 140° C. for 1 hour, and is able to be measured according to the procedures described in [Measurement Method] of Examples. Specifically, the procedures are as follows.

Weight Decreasing Amount (%)=[($W0$−$W1$)/$W0$]×100     Expression (A)

[In Expression (A), W0 represents the mass of the acrylic resin before being heated, and W1 represents the mass of the acrylic resin after being heated.]

The weight decreasing amount is a value obtained by heating 5 mg of the acrylic resin at 140° C. for 1 hour, and by subtracting the weight of the acrylic resin after being heated from the weight of the acrylic resin before being heated.

The weight decreasing amount at the time of heating the acrylic resin used in the present invention at 140° C. for 1 hour is less than or equal to 0.5%. The weight decreasing amount is preferably less than or equal to 0.3%, is more preferably less than or equal to 0.2%, and is even more preferably less than or equal to 0.1%. The weight decreasing amount at the time of heating the acrylic resin at 140° C. for 1 hour is an index of the content of a low molecular weight component contained in the acrylic resin. The acrylic resin having a weight decreasing amount of less than or equal to 0.5% contains a small amount of a low molecular weight component, and thus, it is possible to make the glass transition temperature high and to suppress deformation under a high temperature environment.

<Additive>

Resins other than the acrylic resin, or additives which are generally added to the polarizing plate protective film may be added to the polarizing plate protective film of the present invention, in a range not impairing the effect of the present invention.

In a case where the resin other than the acrylic resin is added, the resin to be added may be in a compatible state, or may be mixed without being dissolved.

In addition, a plasticizer, an ultraviolet absorbent, an antioxidant, a brittleness improver, an optical expression agent, and the like are able to be added as the additive.

The plasticizer has a function of improving fluidity or flexibility of a dope composition which is used at the time of manufacturing the polarizing plate protective film. Examples of the plasticizer include a phthalic acid ester-based plasticizer, a fatty acid ester-based plasticizer, a trimellitic acid ester-based plasticizer, a phosphoric acid ester-based plasticizer, a polyester-based plasticizer, an epoxy-based plasticizer, or the like.

Examples of the ultraviolet absorbent include a benzotriazole-based ultraviolet absorbent, a 2-hydroxy benzophenone-based ultraviolet absorbent, a salicylic acid phenyl ester-based ultraviolet absorbent, or the like. For example, triazoles such as 2-(5-methyl-2-hydroxy phenyl) benzotriazole, 2-[2-hydroxy-3,5-bis(α,α-dimethyl benzyl) phenyl]-2H-benzotriazole, and 2-(3,5-di-t-butyl-2-hydroxy phenyl) benzotriazole, and benzophenones such as 2-hydroxy-4-methoxy benzophenone, 2-hydroxy-4-octoxy benzophenone, and 2,2'-dihydroxy-4-methoxy benzophenone are able to be exemplified.

Further, in order to improve thermal decomposition properties or thermal coloration properties at the time of molding processing, various antioxidants, brittleness improvers, optical expression agents, and the like are also able to be added as the additive.

<Configuration of Film>

[Layer Configuration]

The polarizing plate protective film of the present invention contains the acrylic resin as described above, and specifically, includes at least one polymer film (an acrylic film) containing the acrylic resin as described above. The polarizing plate protective film may be configured of only one polymer film containing the acrylic resin as described above, or may be configured of two or more polymer films containing the acrylic resin described above, and it is preferable that the polarizing plate protective film is configured of only one polymer film containing the acrylic resin as described above.

In addition, the polarizing plate protective film of the present invention may have a multilayer configuration including layers other than the polymer film containing the acrylic resin as described above. In a case where the polarizing plate protective film of the present invention has a multilayer configuration including two or more polymer films containing the acrylic resin as described above, the respective polymer films may have the same composition, or may have different compositions. In addition, in the polarizing plate protective film, the surface of the polymer film containing the acrylic resin as described above may be subjected to a surface treatment described below or may include a functional layer thereon. It is preferable that the polarizing plate protective film of the present invention has a configuration including the polymer film containing the acrylic resin as described above as at least one outermost layer (a layer including an air boundary).

[Film Thickness]

The film thickness of the polarizing plate protective film is preferably greater than or equal to 10 μm, is more preferably 10 μm to 60 μm, is even more preferably 10 μm to 40 μm, and is still more preferably 20 μm to 40 μm. By setting the film thickness to be greater than or equal to 10 μm, moisture permeability of the polarizing plate protective film sufficiently decreases, and excellent moisture resistance is easily imparted to a polarizing plate to which the polarizing plate protective film is applied. In addition, it is preferable that the film thickness is less than or equal to 60 μm from the viewpoint of thinning a liquid crystal display device to which the polarizing plate protective film is applied.

[Number of Times of Folding Endurance]

Herein, the "number of times of folding endurance" is the number of times of folding endurance which is measured in conditions of a load of 100 g on the basis of a method according to JIS P8115.

The number of times of folding endurance of the polarizing plate protective film is preferably greater than or equal to 30 times, is more preferably greater than or equal to 50 times, and is even more preferably greater than or equal to 80 times, in both of a longitudinal direction (an MD direction) and a width direction (a TD direction) of the film. By setting the number of times of folding endurance to be greater than or equal to 30 times, it is possible to determine that brittleness performance is excellent, to easily perform a bonding operation with respect to the polarizing plate, and to reliably protect the polarizing plate to which the polarizing plate protective film is applied.

[Glass Transition Temperature]

Herein, a "glass transition temperature Tg" is a value obtained by measuring a film sample by using a dynamic viscoelasticity measuring instrument (DMA). Dynamic viscoelasticity was measured by applying a tensile load to a test piece of 5 mm×50 mm in conditions of a frequency of 1 Hz, a temperature rising rate of 5° C./minute, a measurement temperature range of 30° C. to 200° C., and a distance between chucks of 50 mm. At this time, the value of an inflection point of a modulus of storage elasticity E' was set to the "glass transition temperature Tg".

In the polarizing plate protective film of the present invention, the glass transition temperature is preferably 110° C. to 200° C., is more preferably 115° C. to 180° C., and is even more preferably 120° C. to 160° C. In the polarizing plate protective film, the glass transition temperature is set to be in the range described above, and thus, deformation in the polarizing plate protective film is suppressed even in a case of applying the polarizing plate protective film to a liquid crystal display device used under a high temperature environment such as the inside of a vehicle in summer, and a function thereof is able to be sufficiently exhibited. In the polarizing plate protective film of the present invention, the acrylic resin includes the methyl methacrylate unit (a) as a main body, and the weight decreasing amount at the time of being heated at 140° C. for 1 hour is regulated to be less than or equal to 0.5%, and thus, it is possible to reliably obtain the glass transition temperature in the range described above.

[Other Properties]

In the polarizing plate protective film of the present invention, retardation Rth is preferably −10 nm to 30 nm, and breaking elongation is preferably greater than or equal to 5%.

Accordingly, the polarizing plate protective film of the present invention is able to be preferably used as a polarizing plate protective film of a liquid crystal display device.

<<Method for Manufacturing Polarizing Plate Protective Film>>

Next, a method for manufacturing a polarizing plate protective film of the present invention will be described.

The method for manufacturing a polarizing plate protective film of the present invention is a method for manufacturing a polarizing plate protective film by a solution film formation method, and includes a film forming step of forming a film by casting a solution in which the acrylic resin described above is dissolved in a solvent on a support and by drying the solution, and of peeling off the film from the support, a first stretching step of stretching the film described above in the longitudinal direction (the MD direction), and a second stretching step of stretching the film described above in the width direction (the TD direction).

Furthermore, in the following description, the solution in which the acrylic resin is dissolved in the solvent may indicate the "dope composition". Here, the acrylic resin to be used includes the methyl methacrylate unit (a), the mass fraction of the alkyl (meth)acrylate unit (b) other than the methyl methacrylate is less than 5 mass %, the weight average molecular weight is 250,000 to 4,000,000, and the weight decreasing amount at the time of being heated at 140° C. for 1 hour is less than or equal to 0.5%.

Hereinafter, each step will be described.

[1] Film Forming Step

In the film forming step, the film is formed by casting the dope composition in which the acrylic resin is dissolved in the solvent on the support, and by drying the dope composition, the film is peeled off from the support, and thus, the film is obtained. Specifically, the step is performed by a dissolving step of preparing the dope composition, a casting film forming step of forming a polymer film by forming a web (still containing a large amount of solvent in a state before being a finished product of a polymer film) by casting the dope composition on the support, and by drying the web, and a polymer film forming step of obtaining the polymer film by peeling off the polymer film from the support described above.

(1-1) Dissolving Step

In the dope preparing step, the acrylic resin, the additive to be added as necessary, and an organic solvent are mixed and stirred, and thus, the dope composition is prepared.

The acrylic resin and the additive can be referred to those in the section of <Acrylic Resin> and <Additive> described above. The following is able to be used as the organic solvent.

(Organic Solvent)

The organic solvent which is useful for forming the dope composition in a case of manufacturing the polarizing plate protective film of the present invention by a solution film formation method is able to be used without any limitation insofar as the acrylic resin and the additive to be added as necessary are dissolved in the organic solvent.

Examples of a chlorine-based organic solvent are able to include methylene chloride, and examples of a non-chlorine-based organic solvent are able to include methyl acetate, ethyl acetate, amyl acetate, acetone, methyl ethyl ketone, methyl isobutyl ketone, tetrahydrofuran, 1,3-dioxolane, 1,4-dioxane, cyclohexanone, formate ethyl, 2,2,2-trifluoroethanol, 2,2,3,3-hexafluoro-1-propanol, 1,3-difluoro-2-propanol, 1,1,1,3,3,3-hexafluoro-2-methyl-2-propanol, 1,1,1,3,3,3-hexafluoro-2-propanol, 2,2,3,3,3-pentafluoro-1-propanol, nitroethane, and the like, and the methylene chloride, the methyl acetate, the ethyl acetate, and the acetone are able to be preferably used.

It is preferable that the dope composition contains 1 mass % to 40 mass % of straight chain or branched chain aliphatic alcohol having carbon atoms of 1 to 4 in addition to the organic solvent described above. In a case where a ratio of alcohol in the dope composition increases, the polymer film is subjected to gelation, peeling from a metal support is easily performed, and when the ratio of alcohol decreases, dissolution of the acrylic resin in a non-chlorine-based organic solvent is accelerated.

Examples of the straight chain or branched chain aliphatic alcohol having 1 to 4 carbon atom are able to include methanol, ethanol, n-propanol, isopropanol, n-butanol, s-butanol, and t-butanol. Among them, the methanol is preferable from the viewpoint of stability of the dope composition, a comparatively low boiling point, excellent drying properties, and the like.

The dope composition is able to be prepared by a general method in which a treatment is performed at a temperature of higher than or equal to 0° C. (a normal temperature or a high temperature). The dope composition of the present invention is able to be prepared by using a preparation method and a preparation device for a dope composition in a general solvent casting method. Furthermore, in a case of a general method, halogenated hydrocarbon (in particular, dichloromethane) and alcohol (in particular, methanol, ethanol, 1-propanol, 2-propanol, 1-butanol, 2-butanol, t-butanol, 1-pentanol, 2-methyl-2-butanol, and cyclohexanol) are preferably used as the organic solvent.

The content of the acrylic resin in the dope composition is preferably 10 mass % to 40 mass %, is more preferably 10 mass % to 35 mass %, and is even more preferably 10 mass % to 30 mass %. An arbitrary additive described below may be added to the organic solvent (a main solvent).

The solution is able to be prepared by stirring the acrylic resin, the additive, and the organic solvent. At this time, a mixture of the respective components may be added to and dissolved in the solvent being stirred, the respective components may be sequentially added to and dissolved in the solvent being stirred, or the dope composition may be formed by preparing a solution of each of the components in advance and by mixing the solutions. The acrylic resin is able to be dissolved by using various dissolving methods such as a method of dissolving the acrylic resin at normal pressure, a method of dissolving the acrylic resin at a temperature lower than or equal to a boiling point of the main solvent, a method of dissolving the acrylic resin at a temperature of higher than or equal to the boiling point of the main solvent under pressurization, a method using a cooling dissolving method as disclosed in JP1997-95544A (JP-H09-95544A), JP1997-95557A (JP-H09-95557A), or JP1997-95538A (JP-H09-95538A), and a method of dissolving the acrylic resin at high pressure as disclosed in JP1999-21379A (JP-H11-21379A), and the method of dissolving the acrylic resin at a temperature of higher than or equal to the boiling point of the main solvent under pressurization is preferable.

It is necessary that a container for preparing the solution is configured such that stirring is able to be performed. The container is able to be pressurized by injecting an inert gas such as nitrogen gas. In addition, an increase in vapor pressure of the solvent due to heating may be used. Alternatively, the container is sealed, and then, each of the components may be added under pressure.

In a case of using heating, it is preferable that the heating is performed from the outside of the container. For example, a jacket type heating device is able to be used. In addition, the entire container is able to be heated by disposing a plate heater on the outside of the container, and by circulating a liquid through a pipe.

It is preferable that a stirrer is disposed in the container, and the stirring is performed by using the stirrer. It is preferable that the stirrer has a length reaching the vicinity of a wall of the container. In order to renew a liquid film on the wall of the container, it is preferable that a scraping blade is disposed on the terminal of the stirrer.

Measuring instruments such as a pressure gauge and a thermometer may be disposed in the container. Each of the components is dissolved in the solvent in the container. The prepared dope composition is taken out from the container after being cooled, or is cooled by using a heat exchanger or the like after being taken out from the container.

(1-2) Casting Film Forming Step and Polymer Film Forming Step

In the casting film forming step, the web is formed by casting the dope composition prepared in the dissolving step on the support, and the polymer film is formed by drying the web. It is preferable that the casting is performed in a step of feeding the dope composition to a pressurizing die through a liquid feeding pump (for example, a pressurizing quantitative gear pump), and of casting the dope composition in a casting position on a metal support of an endless metal belt performing infinite feeding, for example, a stainless steel belt, a rotating metal drum, or the like, from a pressurizing die slit. The pressurizing die in which a slit shape of a base portion of the die is able to be adjusted, and a film thickness easily becomes even is preferable as the die. Examples of the pressurizing die include a coat hanger die, a T die, and the like, and any of them is preferably used. The surface of the metal support is a mirror surface. In order to increase a film formation speed, two or more pressurizing dies may be disposed on the metal support, and the amount of dope composition may be layered by being divided. Alternatively, it is preferable that a film having a laminated structure is obtained by a cocasting method of simultaneously casting a plurality of dope compositions.

Next, the web obtained as described above is dried, and the polymer film is formed. At this time, in general, the web is heated on the support (for example, the metal support), and the solvent is evaporated until the web is able to be peeled off from the support. In order to evaporate the solvent, a method of blowing air to the solvent from the web side and/or a method of transmitting the solvent from the rear surface of the support by a liquid, a method of transmitting the solvent from the front and rear surfaces by radiation heat, and the like are used, and the rear surface liquid transmission method is preferable from the viewpoint of excellent drying efficiency. In addition, a method in which the methods described above are combined is also preferable. In a case of using the rear surface liquid transmission, it is preferable that heating is performed at a temperature of lower than or equal to a boiling point of a main organic solvent or an organic solvent having the lowest boiling point which is used in the dope composition.

In the polymer film forming step, the polymer film formed in the casting film forming step is peeled off from the support, and the polymer film is obtained. It is preferable that a peeling step is a step of peeling the web from which the solvent is evaporated in a peeling position on the support. The peeled off web is sent to the next step. Furthermore, in a case where the amount of residual solvent of the web at the time of being peeled off (the following expression) excessively increases, the web is hardly peeled off, and in contrast, in a case where the web is peeled off after being sufficiently dried on the metal support, a part of the web is peeled off in the middle. The amount of residual solvent of the web on the support at the time of peeling off the web is set according to drying conditions, the length of the support, or the like, and it is preferable that the peeling is performed in a range of 5 mass % to 150 mass %. In a case of performing the peeling at a time point where the amount of residual solvent is large, the amount of residual solvent at the time of peeling off the web is determined according to a balance between an economic speed and quality. In the present invention, a temperature in the peeling position on the metal support is preferably −50° C. to 40° C., is more preferably 10° C. to 40° C., and is most preferably 15° C. to 30° C. In addition, the amount of residual solvent of the web in the peeling position is preferably 10 mass % to 150 mass %, and is more is preferably 10 mass % to 120 mass %. Here, the amount of residual solvent is able to be denoted by the following expression.

Amount of Residual Solvent(mass %)=$[(M-N)/N] \times 100$

Here, M represents the mass of the web at an arbitrary time point, and N represents the mass of the web having a mass at the time of being dried at 130° C. for 3 hours.

After the peeling step, it is preferable that the polymer film is dried by using a drying device in which the web is alternately transported through a plurality of rollers arranged in a drying device, and/or a tenter device in which the web is transported by clipping both ends of the web with a clip. Blowing hot air to both surfaces of the polymer film is general as means for performing drying and a heat treatment, and means for heating the web by being brought into contact with a microwave instead of air is also used. A temperature, an air volume, and a time are different according to the solvent to be used, and conditions may be suitably selected according to the type of solvent to be used, and a combination thereof.

The casting film forming step, the polymer film forming step, and the first stretching step and the second stretching step described below, for example, are able to be continuously performed by a film manufacturing line illustrated in FIG. 1. Here, a film manufacturing line used in a manufacturing method of the present invention is not limited to the film manufacturing line illustrated in FIG. 1. Furthermore, in the film manufacturing line of FIG. 1, the "web", the "polymer film" obtained by drying the web, and a "stretched film" obtained by stretching the polymer film are obtained in the middle of the line, the casting film of the present invention includes all films before the peeling step, and the polymer film of the present invention includes all films after the peeling step.

Figure 1:
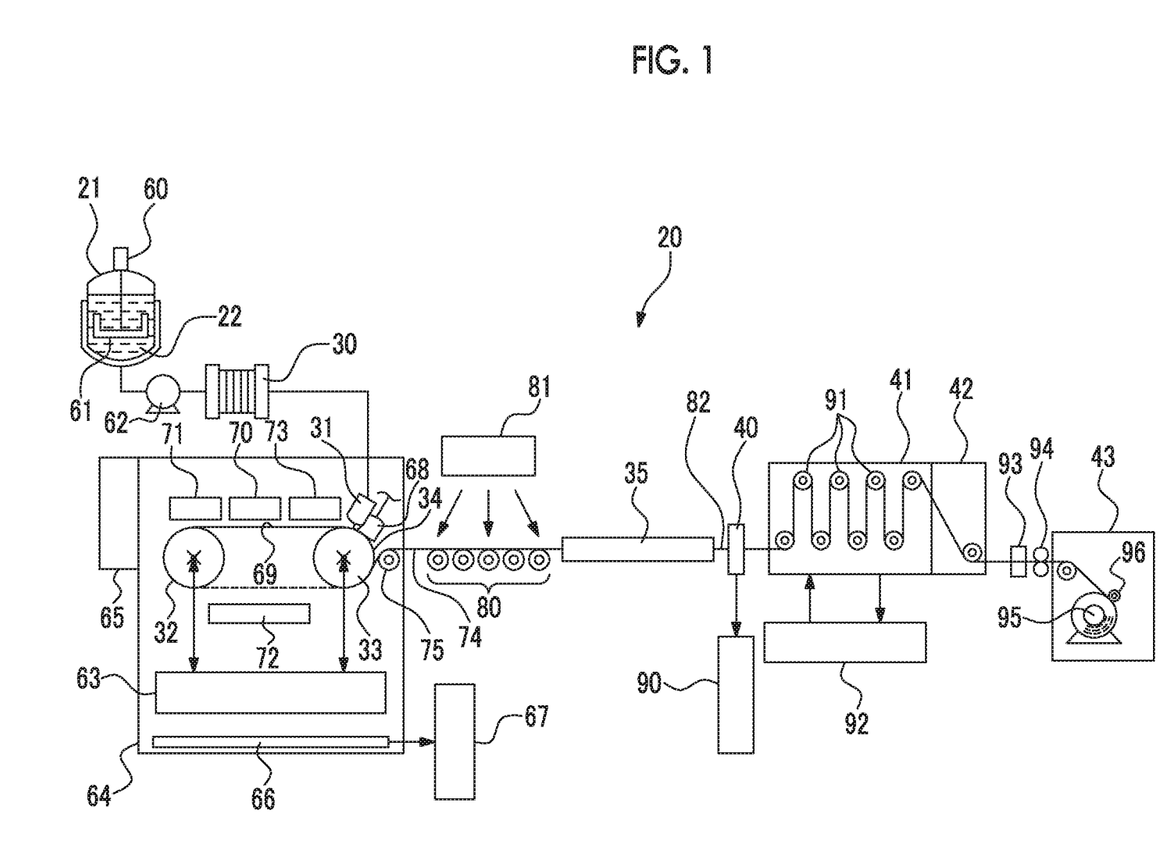
FIG. 1 is a schematic view of a film manufacturing line for carrying out a solution film formation method.

A film manufacturing line 20 illustrated in FIG. 1 includes a stock tank 21, a filtration device 30, a casting die (a support) 31, a casting band 34 stretched between rotating rollers 32 and 33, a tenter type drier 35, and the like. Further, a selvage cutting device 40, a drying chamber 41, a cooling chamber 42, a winding chamber 43, and the like are arranged.

A stirrer 61 which is rotated by a motor 60 is attached to the stock tank 21. Then, the stock tank 21 is connected to the casting die 31 through a pump 62 and the filtration device 30.

It is preferable that the width of the casting die 31 is 1.1 times to 2.0 times the width of a film which becomes a final product.

The casting band 34 stretched between the rotating rollers 32 and 33 is disposed in the lower portion of the casting die 31. The rotating rollers 32 and 33 are rotated by a driving device (not illustrated), and the casting band 34 endlessly travels according to the rotation.

In addition, in order to set the surface temperature of the casting band 34 to a predetermined value, it is preferable that a heat-transmitting medium circulation device 63 is attached to the rotating rollers 32 and 33. It is preferable that the surface temperature of the casting band 34 is able to be adjusted to be −20° C. to 40° C.

It is preferable to use the casting band 34 of which the width is in a range of 1.1 times to 2.0 times the casting width of a dope composition 22. In addition, it is preferable that the casting band is ground such that a length is 20 m to 200 m, a film thickness is 0.5 mm to 2.5 mm, and surface roughness is less than or equal to 0.05 µm. It is preferable that the casting band 34 is formed of stainless steel, and it is more preferable that the casting band 34 is formed of SUS316 in order to have sufficient corrosion resistance and strength. In addition, the casting band 34 in which film thickness unevenness of the entire casting band 34 is less than or equal to 0.5% is preferably used.

Furthermore, the rotating rollers 32 and 33 are able to be directly used as the support.

The casting die 31, the casting band 34, and the like are contained in a casting chamber 64. Temperature adjustment equipment 65 for retaining the internal temperature of the casting chamber 64 at a predetermined value, and a condenser 66 for performing condensation collecting with respect to an organic solvent which is volatilized are disposed in the casting chamber 64. Then, a collecting device 67 for collecting the organic solvent which has been subjected to condensation and liquefaction is disposed on the outside of the casting chamber 64. In addition, it is preferable that a decompression chamber 68 for performing pressure control with respect to a back surface portion of a casting bead which is formed from the casting die 31 to the casting band 34 is disposed, and in this embodiment, the decompression chamber 68 is used.

Blowing ports 70, 71, and 72 for evaporating the solvent in a casting film 69 are disposed in the vicinity of the circumferential surface of the casting band 34.

A crossover portion 80 includes a blowing machine 81, a crusher 90 for finely cutting the excess of a side end portion of a cut film 82 (referred to as a selvage) is connected to the selvage cutting device 40 on downstream of the tenter type drier 35.

The drying chamber 41 includes a plurality of rollers 91, and an adsorption collecting device 92 for performing adsorption collecting with respect to solvent gas generated by being evaporated is attached to the drying chamber 41. A forced static elimination device (a static elimination bar) 93 for adjusting the charging voltage of the film 82 to be in a predetermined range (for example, −3 kV to +3 kV) is disposed on the downstream of the cooling chamber 42. Further, in this embodiment, a knurling applying roller 94 for applying knurling to both edges of the film 82 in embossing processing is suitably disposed on the downstream of the forced static elimination device 93. In addition, a winding roller 95 for winding the film 82, and a press roller 96 for controlling a tension at the time of winding the film are included in the winding chamber 43.

Next, an example of a method of manufacturing the film 82 by using the film manufacturing line 20 (a band manufacturing device) as described above will be described below.

The dope composition 22 consistently becomes even by rotating the stirrer 61. An additive such as a retardation expression agent, a plasticizer, and an ultraviolet absorbent is able to be mixed into the dope composition 22 even at the time of being stirred.

The dope composition 22 is transported to the filtration device 30 by the pump 62 and is filtered through the filtration device 30, and is cast onto the casting band 34 from the casting die 31.

The casting bead is formed from the casting die 31 to the casting band 34, and the casting film 69 is formed on the casting band 34. It is preferable that the temperature of the dope composition 22 at the time of casting is −10° C. to 57° C.

The dope composition 22 forms the casting bead from the casting die 31, and is cast on the casting band 34.

The casting film 69 is moved according to the movement of the casting band 34.

Next, the casting film 69 is continuously transported to a portion on which a blowing port 73 is arranged. Dry air from a nozzle of the blowing port 73 is blown towards the casting film 69.

The solvent is evaporated by being dried, and thus, the casting film 69 (the polymer film) has self-supporting properties, and then, a web 74 is peeled off from the casting band 34 while being supported by a peeling roller 75. It is preferable that the amount of residual solvent at the time of peeling off the web is 20 mass % to 250 mass % on the basis of a solid content.

After that, the crossover portion 80 in which a plurality of rollers are disposed is transported, and the web 74 is transported to the tenter type drier 35. In the crossover portion 80, the web 74 is dried by blowing dry air having a desired temperature from the blowing machine 81. At this time, it is preferable that the temperature of the dry air is 20° C. to 250° C.

[2] Stretching Step

It is preferable that the web 74 is stretched in the longitudinal direction (the MD direction) and the width direction (the TD direction). Here, the longitudinal direction indicates a transport direction of the film, and the width direction indicates a direction which is orthogonal to the transport direction. Hereinafter, conditions of each stretching step will be described by setting stretching in the longitudinal direction as the first stretching step and stretching in the width direction as the second stretching step. After the first stretching step is performed, the film may be wound into the shape of a roll once, and then, the second stretching step may be performed with respect to the film unwound from the roll in off line.

(2-1) First Stretching Step

In the first stretching step, the web 74 is stretched in the longitudinal direction (the MD direction).

In the stretching in the longitudinal direction, for example, the rotation speed of a roller on the downstream side of the crossover portion 80 is faster than the rotation speed of a roller on the upstream side of the crossover portion 80, and thus, it is possible to apply a draw tension to the web 74 in the transport direction.

Here, in the method for manufacturing a polarizing plate protective film of the present invention, a residual volatile content A1 [mass %] of the web 74 in the first stretching step and a surface temperature T1 [° C.] of the film satisfy conditions of Expression (1) described below. Accordingly, it is possible to obtain a polarizing plate protective film in which molecular alignment in the web becomes large, resistance with respect to bending is improved, the number of times of folding endurance increases (brittleness performance is high), and mechanical strength is excellent.

$$T1 \leq 170 - 2.8 A1 \quad \text{Expression (1)}$$

Further, it is preferable that the residual volatile content A1 [mass %] of the web 74 and the surface temperature T1 [° C.] of the film satisfy Expression (1) described above, and satisfy Expression (3) described below. Accordingly, the modulus of elasticity of the web decreases, and thus, in this step, the web 74 is able to be reliably stretched.

$$100 - 3.2 A1 \leq T1 \quad \text{Expression (3)}$$

In addition, the residual volatile content of the web 74 in the first stretching step is preferably 10 mass % to 30 mass %, is more preferably 10 mass % to 25 mass %, and is even more preferably 12 mass % to 20 mass %.

Further, a stretching ratio in the first stretching step is preferably 130% to 180%, is more preferably 140% to 180%, and is even more preferably 150% to 180%. Here, the "stretching ratio (%)" indicates a value obtained by the following expression.

Stretching Ratio (%)=100×Length after Stretching/Length before Stretching (2-2) Second Stretching Step In the second stretching step, the web 74 is stretched in the width direction (the TD direction). By the stretching in the width direction, unevenness which occurs at the time of drying the web and at the time of peeling off the web on the support is able to be reduced, and an excellent film shape is able to be obtained in the surface of the film.

The stretching in the width direction is able to be performed by heating and drying the web 74 which is transported by gripping both end portions of the web 74 with a clip by using the tenter type drier 35. Furthermore, the inside of the tenter type drier 35 is sectionally divided into a temperature zone, and drying conditions are able to be suitably adjusted for each section.

Here, in the method for manufacturing a polarizing plate protective film of the present invention, a residual volatile content A2 [%] of the web 74 in the second stretching step and a surface temperature T2 [° C.] of the film satisfy conditions of Expression (2) described below. Accordingly, it is possible to obtain a polarizing plate protective film in which the number of times of folding endurance increases (the brittleness performance is high), and the mechanical strength is excellent.

$$T2 \leq 170 - 2.8 A2, \quad \text{Expression (2)}$$

Further, it is preferable that the residual volatile content A2 [%] of the web 74 and the surface temperature T2 [° C.] of the film satisfy Expression (2) described above, and satisfy Expression (4) described below. Accordingly, in this step, the web 74 is able to be reliably stretched.

$$100 - 3.2 A2 \leq T2 \quad \text{Expression (4)}$$

In addition, the residual volatile content of the web 74 is preferably less than or equal to 10%, is more preferably less than or equal to 5%, and is even more preferably less than or equal to 3%.

Further, the stretching ratio in the first stretching step is preferably 130% to 180%, is more preferably 140% to 180%, and is even more preferably 150% to 180%.

It is preferable that the temperature at the time of each stretching is in a temperature range of Tg±30° C. with respect to the glass transition temperature Tg of the polymer film which is not stretched after being dried. Here, the glass transition temperature of the polymer film which is not stretched after being dried is the glass transition temperature of the thermoplastic resin described above, and as described above, the glass transition temperature is preferably 110° C. to 200° C., is more preferably 115° C. to 180° C., and is even more preferably 120° C. to 160° C. By performing stretching in this temperature range, it is possible to prepare a desired polarizing plate protective film in which handling aptitude of the film is excellent, and the polymer film is rarely broken. By performing stretching at a temperature of higher than or equal to (Tg−30° C.), a breakage of the film is able to be prevented, and a variation in Rth in the film is able to be suppressed. In addition, by performing stretching at a temperature of lower than or equal to (Tg+30° C.), stretching is able to be prevented by the deadweight of the film, and a variation in Rth in the film is able to be suppressed. In addition, an increase in the total haze due to phase separation in the film and inside haze is able to be suppressed. The temperature at the time of stretching is preferably in a temperature range of Tg±25° C., and is more preferably in a temperature range of Tg±20° C.

Thus, a stretching treatment may be performed in a drying step through the crossover portion 80 and the tenter type drier 35 after the web 74 is formed, or may be performed by drying and then winding the web 74.

In a case where an un-stretched film is prepared, the casting of the present invention is preferably performed in conditions where the film thickness of the film is 10 μm to 200 μm, is more preferably performed in conditions where the film thickness of the film is 20 μm to 150 μm, is even more preferably performed in conditions where the film thickness of the film is 30 μm to 120 μm, and is most preferably performed in conditions where the film thickness of the film is 40 μm to 100 μm.

In a case of setting the film thickness to be in the range described above, it is preferable since the film thickness of the film after being stretched is able to decrease, a change in retardation at the time of changing humidity change, at high temperature, and after being aged in a high temperature high and humidity environment decreases, a small amount of resin is used, and an inexpensive film is able to be manufactured.

The web 74 is dried by the tenter type drier 35 until a predetermined amount of residual solvent is obtained, and then, is transported to the downstream side as the film 82. Both edges in both side end portions of the film 82 are cut by the selvage cutting device 40. The cut side end portion is transported to the crusher 90 by a cutter blower (not illustrated). The side end portion of the film is pulverized by the crusher 90, and becomes a chip. The chip is reused for preparing the dope composition, and thus, this method is effective from the viewpoint of cost. Furthermore, a cutting step of both side end portions of the film is able to be omitted, and it is preferable that the cutting step is performed in any one step from the casting step described above to the step of winding the film described above.

The film 82 of which both side end portions are cut and removed is transported to the drying chamber 41, and is dried. It is preferable that the temperature in the drying chamber 41 is in a range of 50° C. to 160° C. In the drying chamber 41, the film 82 is transported while being wound around a roller 91, and here, the solvent gas generated by being evaporate is adsorbed and collected by the adsorption collecting device 92. Air from which the solvent component is removed is blown again into the drying chamber 41 as the dry air. Furthermore, in order to change a drying temperature, it is more preferable that the drying chamber 41 is divided into a plurality of sections.

The film 82 is cooled to approximately room temperature by the cooling chamber 42. Furthermore, a humidity control chamber (not illustrated) may be disposed between the drying chamber 41 and the cooling chamber 42, and it is preferable that air which is adjusted to have desired humidity and temperature is blown with respect to the film 82 in the humidity control chamber. Accordingly, the occurrence of curling in the film 82 or the occurrence of winding failure at the time of winding is able to be suppressed.

In addition, the charging voltage is set to be in a predetermined range (for example, −3 kV to +3 kV) while the film 82 is transported by the forced static elimination device (the static elimination bar) 93. Further, it is preferable that knurling is applied onto both edges of the film 82 in embossing processing by disposing the knurling applying roller 94. It is preferable that the knurling is applied onto at least one end, and it is more preferable that the knurling is applied onto both ends. The width of the knurling is preferably 3 mm to 50 mm, and is more preferably 5 mm to 30 mm, and the height of the knurling is preferably 0.5 μm to 500 μm, and is more preferably 1 μm to 200 μm. The knurling may be one side pressing, or may be both sides pressing.

Finally, the film 82 is wound around the winding roller 95 in the winding chamber 43. At this time, it is preferable that the film 82 is wound while applying a desired tension to the film 82 by the press roller 96. Furthermore, it is more preferable that the tension is gradually changed from the start of the winding to the end of the winding. The length of the film 82 to be wound in the longitudinal direction (a casting direction) is preferably greater than or equal to 100 m, is more preferably 100 m to 10,000 m, is even more preferably 500 m to 7,000 m, and is still more preferably 1,000 m to 6,000 m. In addition, the width of the film 82 is preferably greater than or equal to 600 mm, is more preferably greater than or equal to 1,100 mm and less than or equal to 2,900 mm, and is even more preferably greater than or equal to 1,800 mm. In addition, the width of the film 82 is preferably less than or equal to 5,000 mm, is more preferably less than or equal to 3,000 mm, and is even more preferably less than or equal to 2,500 mm.

In the solution film formation method of the present invention, when the dope composition is cast, two or more types of dope compositions are able to be subjected to simultaneously laminating cocasting or sequentially laminating cocasting. Further, both cocastings may be combined. At the time of performing the simultaneously laminating cocasting, a casting die to which a feed block is attached may be used, or a manifold type casting die may be used. In a film formed of a plurality of layers by the cocasting, it is preferable that at least one of the thickness of a layer on an air surface side or the thickness of a layer on the support side is 0.5% to 30% of the film thickness of the entire film. Further, in a case where the simultaneously laminating cocasting is performed, it is preferable that a dope composition having high viscosity is wrapped by a dope composition having low viscosity at the time of casting the dope composition from the die slit to the support. In addition, in a case where the simultaneously laminating cocasting is performed, it is preferable that a composition ratio of alcohol in the dope composition which is in contact with the outside is greater than a composition ratio of alcohol in the dope composition on the inside, in the casting bead formed from the die slit to the support.

The structure of the casting die, the decompression chamber, the support, or the like, the cocasting, a peeling method, the stretching, the drying conditions of each of the steps, a handling method, the curling, a winding method after flatness correction, a solvent collecting method, and a film collecting method are specifically disclosed in paragraphs [0617] to [0889] of JP2005-104148A.

In addition, in the above description, an example of the method for manufacturing a polarizing plate protective film of the present invention has been described by using an example in which the dope composition is cast onto the band, but the dope composition may be cast onto the drum.

[Configuration Added to Polymer Film]

The polarizing plate protective film of the present invention may have an additional configuration according to the application thereof. Examples of such a configuration are able to include a surface treatment which is performed with respect to the surface of the polarizing plate protective film, a functional layer which is disposed on the surface of the polymer film, and the like. Hereinafter, the surface treatment and the functional layer will be described.

(Surface Treatment)

In the polarizing plate protective film of the present invention, a surface treatment is performed according to a case, and thus, improvement in adhesiveness between the polarizing plate protective film and other layers (for example, a polarizer, an undercoat layer, and a back layer) is able to be attained. For example, a glow discharge treatment, an ultraviolet ray irradiation treatment, a corona treatment, a flame treatment, and an acid or alkali treatment are able to be used. Here, the glow discharge treatment may be low temperature plasma treatment which is performed under low pressure gas of $10^{-3}$ Torr to 20 Torr, and a plasma treatment which is performed under atmospheric pressure is more preferable. Plasma excitable gas indicates gas which is subjected to plasma excitation in the conditions as described above, and examples of the plasma excitable gas include chlorofluorocarbons such as argon, helium, neon, krypton, xenon, nitrogen, carbon dioxide, and tetrafluoromethane and a mixture thereof, and the like. The details thereof are specifically disclosed in pages 30 to 32 of Journal of Technical Disclosure of Japan Institute for Promoting Invention and Innovation (Technical Disclosure No. 2001-1745, published on Mar. 15, 2001 by Japan Institute for Promoting Invention and Innovation), and are preferably used in the present invention.

(Functional Layer)

In addition, a functional layer having a film thickness of 0.1 μm to 20 μm may be laminated on at least one surface of the polarizing plate protective film of the present invention. The type of functional layer includes a hardcoat layer, an antireflection layer (a layer of adjusting a refractive index such as a layer of low refractive index, a layer of intermediate refractive index, and a layer of high refractive index), an antiglare layer, an antistatic layer, an ultraviolet ray absorption layer, a moisture permeability reducing layer, and the like.

The disposed functional layer described above may be one layer, or may be a plurality of layers. It is preferable that the functional layer is disposed by being cocast onto the polarizing plate protective film of the present invention, or is disposed by being coated onto the polarizing plate protective film of the present invention, as a lamination method of the functional layer described above.

In a case where the functional layer is formed by coating and drying, it is preferable that a monomer having an ethylenically unsaturated group is used as a binder. The monomer may be monofunctional or multifunctional. Among them, it is preferable that a polymerizable multifunctional monomer is used, it is more preferable that a photopolymerizable multifunctional monomer is used, and it is particularly preferable that a coating liquid containing a monomer having two or more (meth)acryloyl groups is used.

Specific examples of the monomer having two or more (meth)acryloyl groups are able to include (moth)acrylic acid diesters of alkylene glycol such as neopentyl glycol acrylate, 1,6-hexanediol (meth)acrylate, and propylene glycol di(meth)acrylate; (meth)acrylic acid diesters of polyoxy alkylene glycol such as triethylene glycol di(meth)acrylate, dipropylene glycol di(meth)acrylate, polyethylene glycol di(meth) acrylate, and polypropylene glycol di(meth)acrylate; (meth) acrylic acid diesters of polyhydric alcohol such as pentaerythritol di(meth)acrylate; (meth)acrylic acid diesters of an ethylene oxide adduct or a propylene oxide adduct such as 2,2-bis {4-(acryloxy.diethoxy) phenyl} propane and 2-2-bis{4-(acryloxy.polypropoxy) phenyl} propane; and the like.

Further, epoxy (meth)acrylates, urethane (meth)acrylates, and polyester (meth)acrylates are also preferably used as the photopolymerizable multifunctional monomer.

Among them, esters of polyhydric alcohol and a (meth) acrylic acid are preferable. The polyhydric alcohol indicates dihydric or more alcohol.

A multifunctional monomer having three or more (meth) acryloyl groups in one molecule is more preferable. Examples of the multifunctional monomer having three or more (meth)acryloyl groups in one molecule include pentaerythritol tetra(meth)acrylate, pentaerythritol tri(meth) acrylate, trimethylol propane tri(meth)acrylate, ethylene oxide-modified trimethylol propane tri(meth)acrylate, propylene oxide-modified trimethylol propane tri(meth)acrylate, ethylene oxide-modified phosphoric acid tri(meth)acrylate, trimethylol ethane tri(meth)acrylate, ditrimethylol propane tetra(meth)acrylate, dipentaerythritol tetra(meth) acrylate, dipentaerythritol penta(meth)acrylate, dipentaerythritol hexa(meth)acrylate, 1,2,3-cyclohexane tetramethacrylate, polyurethane polyacrylate, polyester polyacrylate, caprolactone-modified tris(acryloxy ethyl)isocyanurate, and the like.

Further, examples of a resin having three or more (meth) acryloyl groups include an oligomer, a prepolymer, or the like of a polyester resin, a polyether resin, an acrylic resin, an epoxy resin, an urethane resin, an alkyd resin, a spiroacetal resin, a polybutadiene resin, and a polythiol polyene resin which have a comparatively low molecular weight, and a multifunctional compound such as polyhydric alcohol.

For example, a dendrimer disclosed in JP2005-76005A and JP2005-36105A is able to be used as the other multifunctional monomer described above.

In addition, esters of polyhydric alcohol and a (meth) acrylic acid, and amides of polyhydric alcohol and isocyanate having a plurality of (meth)acryloyl groups are also preferably used as the multifunctional monomer.

The polyhydric alcohol is not particularly limited, aliphatic alcohol is preferable, and among them, alcohol having a cyclic aliphatic hydrocarbon group is more preferable. A cycloalkyl group having 3 to 8 carbon atoms is preferable as an aliphatic group of monocyclic alicyclic alcohol, and examples of the cycloalkyl group having 3 to 8 carbon atoms are able to include a cyclopentyl group, a cyclohexyl group, a cyclobutyl group, a cyclooctyl group, and the like.

Examples of an aliphatic group of polycyclic alicyclic alcohol are able to include a group having a bicyclo structure, a tricyclo structure, a tetracyclo structure, and the like which have carbon atoms of greater than or equal to 5, a cycloalkyl group having 6 to 20 carbon atoms is preferable, and examples of the cycloalkyl group having 6 to 20 carbon atoms are able to include an adamantyl group, a norbornyl group, a dicyclopentyl group, a tricyclodecanyl group, a tetracyclododecyl group, a center skeleton of a compound disclosed in claims of JP2006-215096A, a center skeleton of a compound disclosed in JP2001-10999A, and the like. Furthermore, a part of the carbon atoms in the cycloalkyl group may be substituted with a hetero atom such as an oxygen atom.

Among them, polyhydric alcohols having the adamantyl group, the norbornyl group, the dicyclopentyl group, the tricyclodecanyl group, the tetracyclododecyl group, the center skeleton of the compound disclosed in claims of JP2006-215096A, and the center skeleton of the compound disclosed in JP2001-10999A are particularly preferable as polycyclic alcohol, from the viewpoint of decreasing moisture permeability.

Two or more types of polymerizable multifunctional monomers may be used in combination. The monomer having such an ethylenically unsaturated group is able to be polymerized by performing irradiation of ionizing radiation or heating in the presence of a photoradical initiator or a thermal radical initiator.

It is preferable that the photopolymerization initiator is used in a polymerization reaction of the photopolymerizable multifunctional monomer. A photoradical polymerization initiator and a photocationic polymerization initiator are preferable as the photopolymerization initiator, and the photoradical polymerization initiator is particularly preferable.

In addition, it is preferable that the polymerizable multifunctional monomer described above and a monofunctional monomer are used in combination.

A monomer having one (meth)acryloyl group is preferable as the monofunctional monomer, and in general, the monomer having one (meth)acryloyl group is able to be obtained from monohydric alcohol and an acrylic acid.

The monohydric alcohol described above may be aromatic alcohol, or may be aliphatic alcohol.

Examples of the monohydric alcohol include methyl alcohol, n-propyl alcohol, iso-propyl alcohol, n-butyl alcohol, tert-butyl alcohol, n-amyl alcohol, diacetone alcohol, 1-methoxy-2-propanol, furfuryl alcohol, 2-octanol, 2-ethyl hexanol, nonanol, n-decanol, undecanol, n-dodecanol, trimethyl nonyl alcohol, benzyl alcohol, phenethyl alcohol, ethylene glycol monoisoamyl ether, ethylene glycol monophenyl ether, ethylene glycol monobenzyl ether, and ethylene glycol monohexyl ether.

In addition, an aliphatic portion of the aliphatic alcohol may be a cyclic aliphatic portion. The cyclic aliphatic portion may be a monocyclic aliphatic portion, or may be a polycyclic aliphatic portion, and in a case of the polycyclic aliphatic portion, the aliphatic portion may be a bridged aliphatic portion. A cycloalkyl group having 3 to 8 carbon atoms is preferable as the monocyclic aliphatic portion, and examples of the cycloalkyl group having 3 to 8 carbon atoms are able to include a cyclopentyl group, a cyclohexyl group, a cyclobutyl group, a cyclooctyl group, and the like. Examples of the polycyclic aliphatic portion are able to include a group having a bicyclo structure, a tricyclo structure, a tetracyclo structure, and the like which have carbon atoms of greater than or equal to 5, a cycloalkyl group having 6 to 20 carbon atoms is preferable, and examples of the cycloalkyl group having 6 to 20 carbon atoms are able to include an adamantyl group, a norbornyl group, a dicyclopentyl group, a tricyclodecanyl group, a tetracyclododecyl group, a center skeleton of a compound disclosed in claims of JP2006-215096A, a center skeleton of a compound disclosed in JP2001-10999A, and the like. Furthermore, a part of the carbon atoms in the cycloalkyl group may be substituted with a hetero atom such as an oxygen atom.

The monohydric alcohol may be aromatic alcohol, or may be aliphatic alcohol, and monohydric alcohol having carbon atoms of greater than or equal to 6 is preferable.

An acrylic acid and a methacrylic acid are preferable as the (meth)acrylic acid.

In addition, in order to use the antireflection layer (the layer of adjusting a refractive index such as the layer of low refractive index, the layer of intermediate refractive index, and the layer of high refractive index), the antiglare layer, the antistatic layer, the ultraviolet ray absorption layer, and the moisture permeability reducing layer as the functional layer, various adducts may be added.

The thickness of the functional layer described above is preferably 0.01 μm to 100 μm, and is particularly preferably 0.02 μm to 50 μm. Further, a functional layer having a thickness of 0.1 μm to 20 μm is more particularly preferable as the functional layer of reducing moisture permeability.

In a case where the functional layer of reducing the moisture permeability described above is used, a ratio (C/D) of moisture permeability (C) of a polarizing plate protective film in which the functional layer is laminated to moisture permeability (D) of a polarizing plate protective film in which the functional layer is not laminated is preferably less than or equal to 0.9. The ratio (C/D) is more preferably less than or equal to 0.85, and is even more preferably less than or equal to 0.8.

<<Polarizing Plate>>

Next, a polarizing plate of the present invention will be described.

The polarizing plate of the present invention includes the polarizing plate protective film of the present invention. The configuration of the polarizing plate protective film of the present invention can be referred to that in the description in the section of [Polarizing Plate Protective Film] described above.

The polarizing plate is able to be prepared by a general method. Examples of a method for manufacturing the polarizing plate include a method in which the polarizing plate protective film of the present invention is subjected to an alkali treatment, and is bonded to both surfaces of a polarizer which is prepared by dipping and stretching a polyvinyl alcohol film in an iodine solution by using an aqueous solution of completely saponified polyvinyl alcohol. Easily adhesive processing as disclosed in JP1994-94915A (JP-H06-94915A) and JP1994-118232A (JP-H06-118232A) may be performed instead of the alkali treatment. In addition, the surface treatment as described above may be performed.

Example of an adhesive agent which is used for bonding the treatment surface of the polarizing plate protective film to the polarizer include a polyvinyl alcohol-based adhesive agent such as polyvinyl alcohol and polyvinyl butyral, a vinyl-based latex such as butyl acrylate, and the like.

The polarizing plate protective film and the polarizer may be bonded by other adhesive agents or pressure sensitive adhesive agents, or may be directly laminated without using the adhesive agent or the pressure sensitive adhesive agent.

It is preferable that the polarizing plate is configured as a polarizing plate protective film which protects the polarizer and both surfaces thereof, and it is more preferable that the polarizing plate is configured by bonding a protective film to one surface of the polarizing plate, and by bonding a separate film to the opposite surface thereof. The protective film and the separate film are used for protecting the polarizing plate at the time of shipping the polarizing plate, at the time of performing product inspection, and the like. In this case, the protective film is bonded in order to protect the surface of the polarizing plate, and is used in the surface of the polarizing plate on a side opposite to the surface of the polarizing plate which is bonded to a liquid crystal plate. In addition, the separate film is used for covering an adhesive layer which is bonded to the liquid crystal plate, and is used in the surface of the polarizing plate which is bonded to the liquid crystal plate.

In general, a substrate including a liquid crystal cell is arranged between two polarizing plates in a liquid crystal display device, but the polarizing plate protective film of the present invention is able to be used as a protective film of any one of the two polarizing plates, and among the two polarizing plate protective films of the polarizing plate, a polarizing plate protective film which is used as a polarizing plate protective film arranged on the liquid crystal cell side with respect to the polarizer is preferable.

<<Liquid Crystal Display Device>>

A liquid crystal display device of the present invention includes the polarizing plate of the present invention, it is preferable that the liquid crystal display device includes a liquid crystal cell, and the polarizing plate of the present invention which is arrange on at least one side of the liquid crystal cell, and it is more preferable that the liquid crystal display device has a configuration in which the polarizing plate protective film of the present invention included in the polarizing plate described above is arranged to be an outermost layer.

(Configuration of General Liquid Crystal Display Device)

It is preferable that the liquid crystal display device has a configuration including a liquid crystal cell formed by supporting a liquid crystal between two electrode substrates, two polarizing plates arranged on both sides of the liquid crystal cell, and at least one optical compensation film arranged between the liquid crystal cell and the polarizing plate, as necessary.

In general, a liquid crystal layer of the liquid crystal cell is formed by sealing a space which is formed by interposing a spacer between two substrates with a liquid crystal. A transparent electrode layer is formed on the substrate as a transparent film containing a conductive substance. A gas barrier layer, a hardcoat layer, or an undercoat layer (used in adhesion of the transparent electrode layer) may be further disposed in the liquid crystal cell. In general, the layers described above are disposed on the substrate. In general, the substrate of the liquid crystal cell has a thickness of 50 μm to 2 mm.

(Type of Liquid Crystal Display Device)

The polarizing plate protective film of the present invention is able to be used in a liquid crystal cell in various display modes. Various display modes such as a Twisted Nematic (TN) mode, an In-Plane Switching (IPS) mode, a Ferroelectric Liquid Crystal (FLC) mode, an Anti-ferroelectric Liquid Crystal (AFLC) mode, an Optically Compensatory Bend (OCB) mode, a Super Twisted Nematic (STN) mode, a Vertically Aligned (VA) mode, an Electrically Controlled Birefringence (ECB) mode, and a Hybrid Aligned Nematic (HAN) mode are proposed. In addition, a display mode in which the display modes described above are subjected to alignment division is also proposed. The polarizing plate protective film of the present invention is effective in a liquid crystal display device in any display mode. In addition, the polarizing plate protective film of the present invention is effective in any one of a transmissive type liquid crystal display device, a reflective type liquid crystal display device, and a semitransmissive type liquid crystal display device.

EXAMPLES

Hereinafter, the present invention will be specifically described on the basis of examples. Materials, reagents, substance quantities and ratios thereof, operations, and the like described in the following examples are able to be suitably changed insofar as the change is not departed from the gist of the present invention. Accordingly, the scope of the present invention is not limited to the following examples. Furthermore, in the following description, "MMA" indicates methyl methacrylate, "MA" indicates methyl acrylate.

(Acrylic Resin)

Manufacturing Example 1

An acrylic resin (a PMMA resin) having a weight average molecular weight of 1,300,000, an MMA ratio of 100%, an MA ratio of 0%, and a heating loss of 0.10% which was used in Examples 1 and 101 to 106, and Comparative Examples 101 to 107 was synthesized by the following method.

300 g of ion exchange water and 0.6 g of polyvinyl alcohol (a degree of saponification of 80% and a degree of polymerization of 1,700) were added to a three-neck flask of 1 L to which a mechanical stirrer, a thermometer, and a cooling pipe were attached and were stirred, the polyvinyl alcohol was completely dissolved, and then, 100 g of methyl methacrylate and 0.15 g of azo bisisobutyronitrile were added and reacted with each other at 85° C. for 6 hours. The obtained suspension liquid was filtered through nylon filter cloth and was washed with methanol, a filtrate was dried all night at 50° C., and thus, an aimed polymer was obtained in the shape of a bead (92.0 g).

Manufacturing Example 2

An acrylic resin having a weight average molecular weight of 1,300,000, an MMA ratio of 100%, an MA ratio of 0%, and a heating loss of 0.30% which was used in Example 5 was synthesized by the following method.

An aimed polymer was obtained in the shape of a bead by the same method as that in Manufacturing Example 1 except that methanol washing was not performed (90.0 g).

Manufacturing Example 3

An acrylic resin having a weight average molecular weight of 1,300,000, an MMA ratio of 100%, an MA ratio of 0%, and a heating loss of 1.0% which was used in Comparative Example 3 was synthesized by the same method as that in Manufacturing Example 2 except that an initiator was changed to benzoyl peroxide.

Other Manufacturing Examples

An acrylic resin having a weight average molecular weight of 800,000, an MMA ratio of 100%, an MA ratio of 0%, and a heating loss of 0.10% which was used in Example 2 was synthesized by the same method as that in Manufacturing Example 1 except that a reaction time was set to 3 hours.

An acrylic resin having a weight average molecular weight of 500,000, an MMA ratio of 100%, an MA ratio of 0%, and a heating loss of 0.10% which was used in Example 3 was synthesized by the same method as that in Manufacturing Example 1 except that a reaction time was set to 2 hours.

An acrylic resin having a weight average molecular weight of 100,000, an MMA ratio of 95%, an MA ratio of 5%, and a heating loss of 0.10% which was used in Comparative Example 1 was synthesized by the same method as that in Manufacturing Example 1 except that 100 g of the methyl methacrylate was changed to a mixture of 95 g of methyl methacrylate and 5 g of methyl acrylate, and a reaction time was set to 0.5 hours.

An acrylic resin having a weight average molecular weight of 800,000, an MMA ratio of 97%, an MA ratio of 3%, and a heating loss of 0.10% which was used in Example 4 was synthesized by the same method as that in Manufacturing Example 1 except that 100 g of the methyl methacrylate was changed to a mixture of 97 g of methyl methacrylate and 3 g of methyl acrylate, and a reaction time was set to 3 hours.

An acrylic resin having a weight average molecular weight of 800,000, an MMA ratio of 95%, an MA ratio of 5%, and a heating loss of 0.10% which was used in Comparative Example 2 was synthesized by the same method as that in Manufacturing Example 1 except that 100 g of the methyl methacrylate was changed to a mixture of 95 g of methyl methacrylate and 5 g of methyl acrylate, and a reaction time was set to 3 hours.

[Measurement Method]

(Weight Average Molecular Weight)

The weight average molecular weight of the acrylic resin was measured by gel chromatography. Measurement conditions are as follows.

| | |
|---|---|
| Solvent | Tetrahydrofuran |
| Device Name | TOSOH HLC-8220GPC |
| Column | Three TOSOH TSKgel Super HZM-H (4.6 mm × 15 cm) Were Used by Being Connected. |
| Column Temperature | 25° C. |
| Sample Concentration | 0.1 mass % |
| Flow Rate | 0.35 ml/min |
| Calibration Curve | TSK Standard Polystyrene manufactured by Tosoh Corporation, Calibration curves of Seven Samples of Mw = 2,800,000 to 10,500,000 Were Used. |

(Heating Loss)

5 mg of the acrylic resin was heated at 140° C. for 1 hour, the mass of the acrylic resin before and after being heated was measured. From the measurement values, a weight decreasing amount (the heating loss) was obtained on the basis of Expression (A) described below.

$$\text{Weight Decreasing Amount (\%)}=[(W0-W1)/W0]\times 100 \quad \text{Expression (A)}$$

[In Expression (A), W0 represents the mass of the acrylic resin before being heated, and W1 represents the mass of the acrylic resin after being heated.]

Example 1

[Preparation of Polymer Film]

(Dissolving Step: Preparation of Dope Composition)

The following compositions were put into a mixing tank and were stirred while being heated, each component was dissolved, and thus, a dope composition was prepared.

(Dope Composition)

| | |
|---|---|
| PMMA Resin | 100 parts by mass |
| Additive | 10 parts by mass |
| Dichloromethane | 534 parts by mass |
| Methanol | 46 parts by mass |

The dope composition prepared as described above was evenly cast onto a stainless steel endless band (a casting support) having a width of 2,000 mm from a casting die by using a band casting device as illustrated in FIG. 1. The dope composition was peeled off from the casting support as a polymer film at a time point where the amount of residual solvent in the dope composition was 20 mass %.

(First Stretching Step and First Drying Step)

The peeled polymer film was transported while being actively stretched in an MD direction by a tenter in conditions shown in Table 1 described below, and thus, a first stretching step was performed, and a first drying step was performed in a drying zone in conditions shown in Table 1 described below.

The polymer film after the first drying step was wound once into the shape of a roll.

(Second Stretching Step and Second Drying Step)

After that, the polymer film was unwound from the roll, a second stretching step was performed in off line by using a separate tenter in conditions shown in Table 1 described below, and a second drying step was performed in a drying zone in conditions shown in Table 1 described below.

A polymer film having a thickness of 40 μm was prepared by the steps described above. A single-layer film of the polymer film obtained as described above was set to a polarizing plate protective film of Example 1.

[Evaluation]

(Number of Times of Folding Endurance)

In the polarizing plate protective film, the number of times of folding endurance which was measured in conditions of a load of 100 g on the basis of a method according to JIS P8115 was measured. The obtained results were shown in Table 1 described below.

(Film Surface Shape)

The maximum height difference (a P-V value) of the film thickness of the polarizing plate protective film was measured by a FUJINON fringe analysis device (FX-03). At this time, a measurement area was set to a range of a diameter of ϕ=60 mm. The average refractive index of 1.48 of the acrylic resin was used as the value of a refractive index to be polarizing plate protective film. In addition, the resolution of this device is 512×512.

A: The maximum height difference (the P-V value) of the film thickness is less than or equal to 1.1 μm.

B: The maximum height difference (the P-V value) of the film thickness is greater than 1.1 μm and less than or equal to 3.0 μm.

C: The maximum height difference (the P-V value) of the film thickness is greater than 3.0 μm.

The obtained results were shown in Table 1 described below.

(Dimensional Change Before and after Aging at 105° C. for 2 Hours)

In the polarizing plate protective film, a rate of dimensional change before and after aging at 105° C. for 2 hours, that is, the value of (L'−L0)/L0}×100% was obtained with respect to a film transport direction. Here, L0 described above represents a film length (unit: mm) before aging at 105° C. for 2 hours, and L' described above represents a film length (unit: mm) after aging at 105° C. for 2 hours, and then, aging at 25° C. for 2 hours under an environment of relative humidity of 60%. In addition, the used sample film had a size of 30 mm×120 mm, and other conditions were as follows.

A hole of 6 mmϕ was formed at intervals of 100 mm to be parallel to the side of 120 mm in the film by using an automatic pin gauge (manufactured by Shinto Scientific Co., Ltd.) after humidity control at 25° C. for longer than or equal to 2 hours under an atmosphere of relative humidity of 60%, the full size (L0) of the interval was measured up to the minimum gradation of 1/1,000 mm. Then, the dimension L' of the interval of the punching after aging at 105° C. for 2 hours and after humidity control at 25° C. for 2 hours under an atmosphere of relative humidity of 60% was measured.

The results of classifying the obtained rates of dimensional change as follows were shown in Table 1.

A: The rate of dimensional change is less than 0.2%.
B: The rate of dimensional change is greater than or equal to 0.2% and less than 0.8%.
C: The rate of dimensional change is greater than or equal to 0.8%.

Examples 2 to 5 and Comparative Examples 1 to 3

A polarizing plate protective film was prepared by the same method as that in Example 1 except that an acrylic resin having a weight average molecular weight and an MA ratio shown in Table 1 described below was used as the acrylic resin. Each evaluation item was measured by the same method as that in Example 1.

As shown in Table 1 described above, all of the polarizing plate protective films of the respective examples had an excellent surface shape and a reduced dimensional change after heating.

In contrast, in the polarizing plate protective film of Comparative Example 1 where the weight average molecular weight of the acrylic resin was less than 250,000, step-like unevenness was observed on the surface, and the surface shape deteriorated.

In addition, in the polarizing plate protective film of the Comparative Example 2 where the MA ratio of the acrylic resin was large and the polarizing plate protective film of Comparative Example 3 where the heating loss was greater than 0.5%, the dimensional change after heating was also large.

TABLE 1

| | Acrylic Resin | | | First Stretching Step | | First Drying Step | | Second Stretching Step |
|---|---|---|---|---|---|---|---|---|
| | Mw | MA Ratio | Heating Loss | Residual Volatile Content | Temperature | Stretching Ratio | Drying Temperature | Drying Time | Residual Volatile Content |
| Example 1 | 1,300,000 | 0% | 0.10% | 20% | 60° C. | 140% | 140° C. | 30 Minutes | 0% |
| Example 2 | 800,000 | 0% | 0.10% | 20% | 60° C. | 140% | 140° C. | 30 Minutes | 0% |
| Example 3 | 500,000 | 0% | 0.10% | 20% | 60° C. | 140% | 140° C. | 30 Minutes | 0% |
| Comparative Example 1 | 100,000 | 5% | 0.10% | 20% | 60° C. | 140% | 140° C. | 30 Minutes | 0% |
| Example 4 | 800,000 | 3% | 0.10% | 20% | 60° C. | 140% | 140° C. | 30 Minutes | 0% |
| Comparative Example 2 | 800,000 | 5% | 0.10% | 20% | 60° C. | 140% | 140° C. | 30 Minutes | 0% |
| Comparative Example 3 | 1,300,000 | 0% | 1.00% | 20% | 60° c. | 140% | 140° C. | 30 Minutes | 0% |
| Example 5 | 1,300,000 | 0% | 0.30% | 20% | 60° C. | 140% | 140° C. | 30 Minutes | 0% |

| | Second Stretching Step | | Second Drying Step | | Film Thickness [μm] | Number of Times of Folding Endurance | | Surface Shape | Rate of Dimensional Change before and after Aging at 105° C. for 2 h |
|---|---|---|---|---|---|---|---|---|---|
| | Stretching Temperature | Ratio | Drying Temperature | Drying Time | | MD | TD | | |
| Example 1 | 120° C. | 140% | None | — | 40 | 50 | 120 | A | A |
| Example 2 | 120° C. | 140% | None | — | 40 | 50 | 120 | B | A |
| Example 3 | 120° C. | 140% | None | — | 40 | 40 | 100 | B | A |
| Comparative Example 1 | 120° C. | 140% | None | — | 40 | 20 | 50 | C | C |
| Example 4 | 120° C. | 140% | None | — | 40 | 50 | 120 | B | B |
| Comparative Example 2 | 120° C. | 140% | None | — | 40 | 50 | 120 | B | C |
| Comparative Example 3 | 120° C. | 140% | None | — | 40 | 50 | 120 | A | C |
| Example 5 | 120° C. | 140% | None | — | 40 | 50 | 120 | A | B |

Examples 101 to 106 and Comparative Examples 101 to 107

A polymer film was prepared by the same method as that in Example 1 except that the first stretching step and the second stretching step were performed in conditions as shown in Table 1. Each evaluation item was measured by the same method as that in Example 1. The obtained results were shown in Table 2 described below.

TABLE 2

| | Acrylic Resin | | | First Stretching Step | | | First Drying Step | | Second Stretching Step |
|---|---|---|---|---|---|---|---|---|---|
| | Mw | MA Ratio | Heating Loss | Residual Volatile Content | Temperature | Stretching Ratio | Drying Temperature | Drying Time | Residual Volatile Content |
| Example 101 | 1,300,000 | 0% | 0.10% | 20% | 60° C. | 140% | 140° C. | 30 Minutes | 0% |
| Example 102 | 1,300,000 | 0% | 0.10% | 20% | 100° C. | 140% | 140° C. | 30 Minutes | 0% |
| Example 103 | 1,300,000 | 0% | 0.10% | 20% | 40° C. | 140% | 140° C. | 30 Minutes | 0% |
| Comparative Example 101 | 1,300,000 | 0% | 0.10% | 20% | 120° C. | 140% | 140° C. | 30 Minutes | 0% |
| Comparative Example 102 | 1,300,000 | 0% | 0.10% | 20% | 20° C. | 140% | Stretching Unavailable | | |
| Example 104 | 1,300,000 | 0% | 0.10% | 20% | 60° C. | 140% | 140° C. | 30 Minutes | 0% |
| Comparative Example 103 | 1,300,300 | 0% | 0.10% | 20% | 60° C. | 140% | 140° C. | 30 Minutes | 0% |
| Comparative Example 104 | 1,300,000 | 0% | 0.10% | 20% | 60° C. | 140% | 140° C. | 30 Minutes | 0% |
| Comparative Example 105 | 1,300,000 | 0% | 0.10% | 15% | 40° C. | 140% | Stretching Unavailable | | |
| Example 105 | 1,300,000 | 0% | 0.10% | 20% | 60° C. | 140% | None | — | 10% |
| Example 106 | 1,300,000 | 0% | 0.10% | 20% | 60° C. | 140% | None | — | 10% |
| Comparative Example 106 | 1,300,000 | 0% | 0.10% | 20% | 60° C. | 140% | None | — | 10% |
| Comparative Example 107 | 1,300,000 | 0% | 0.10% | 20% | 60° C. | 140% | None | — | 10% |

| | Second Stretching Step | | Second Drying Step | | Film Thickness [μm] | Number of Times of Folding Endurance | | Surface Shape | Rate of Dimensional Change before and after Aging at 105° C. for 2 h |
|---|---|---|---|---|---|---|---|---|---|
| | Temperature | Stretching Ratio | Drying Temperature | Drying Time | | MD | TD | | |
| Example 101 | 120° C. | 140% | None | — | 40 | 50 | 120 | A | A |
| Example 102 | 120° C. | 140% | None | — | 40 | 40 | 120 | A | A |
| Example 103 | 120° C. | 140% | None | — | 40 | 60 | 120 | A | A |
| Comparative Example 101 | 120° C. | 140% | None | — | 40 | 20 | 120 | A | A |
| Comparative Example 102 | | | Stretching Unavailable | | | | | | |
| Example 104 | 160° C. | 140% | None | — | 40 | 40 | 50 | A | A |
| Comparative Example 103 | 180° C. | 140% | None | — | 40 | 20 | 20 | A | A |
| Comparative Example 104 | 80° C. | 140% | None | — | Stretching Unavailable | | | | |
| Comparative Example 105 | | | Stretching Unavailable | | | | | | |
| Example 105 | 120° C. | 140% | 140° C. | 30 Minutes | 40 | 50 | 50 | A | A |
| Example 106 | 80° C. | 140% | 140° C. | 30 Minutes | 40 | 50 | 60 | A | A |
| Comparative Example 106 | 160° C. | 140% | 140° C. | 30 Minutes | 40 | 20 | 20 | A | A |
| Comparative Example 107 | 60° C. | 140% | None | — | Stretching Unavailable | | | | |

From Table 2 described above, the polymer film of Comparative Example 101 where the temperature in the first stretching step was higher than a predetermined range and polymer films of Comparative Examples 103 and 106 where the temperature in the second stretching step was higher than a predetermined range, the number of times of folding endurance was reduced.

Furthermore, in Comparative Examples 102 and 105 where a first stretching temperature was lower than the predetermined range and Comparative Examples 104 and 107 where a second stretching temperature was lower than the predetermined range, the stretching was not able to be performed.

Figure 2:
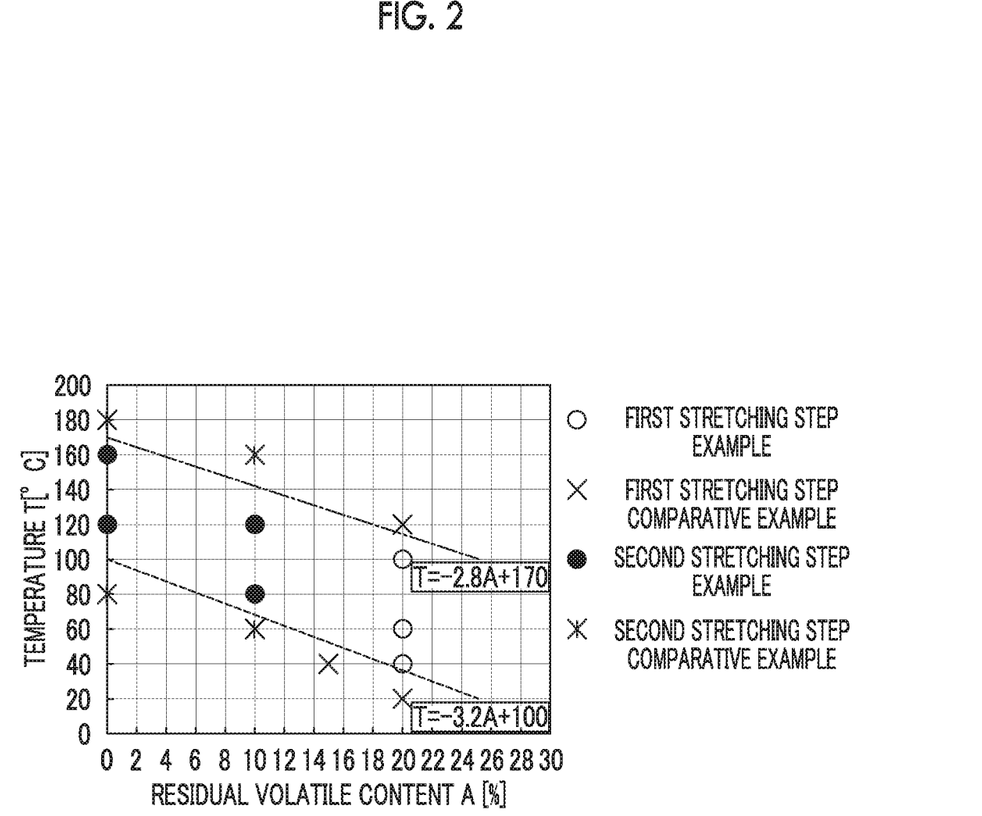
FIG. 2 is a graph illustrating a relationship between a residual volatile content and a temperature of a film.

The results where the relationship between the residual volatile content and the temperature in each step of the first stretching step and the second stretching step in Table 2 was plotted are illustrated in FIG. 2. All of the films of the examples where the stretching was able to be performed, brittleness performance was excellent, and heat resistance and a surface shape were excellent satisfied Expressions (1) to (4) described above.

<Preparation of Polarizing Plate>

The polarizing plate protective film of each of the examples and FUJITEC TD60UL (manufactured by Fujifilm Corporation) were dipped into an aqueous solution of sodium hydroxide (a saponification liquid) of 4.5 mol/L of which the temperature was adjusted to be 37° C. for 1 minute, and then, the film was washed with water, and after that, the film was dipped into an aqueous solution of a sulfuric acid of 0.05 mol/L for 30 seconds, and then, the film was further washed with water. Then, water drainage was repeated three times by using an air knife, the film was dried in a drying zone at 70° C. by being retained for 15 seconds after the water drainage, and a film which had been subjected to a saponification treatment was prepared.

According to Example 1 of JP2001-141926A, a rotation speed difference was provided between two pairs of nip rolls, the stretching was performed in a longitudinal direction, and thus, a polarizer having a thickness of 20 m was prepared.

The polarizers obtained as described above, and two films which had subjected to the saponification treatment described above were selected, the polarizer described above was interposed between the films, and then, the polarizer was bonded to the two films in the manner of roll-to-roll such that a polarization axis was orthogonal to the longitudinal direction of the film by using an aqueous solution of PVA (PVA-117H manufactured by KURARAY CO., LTD.) of 3% as an adhesive agent, and thus, a polarizing plate was prepared. Here, one film of the polarizer was set to a film in which one film selected from the group consisting of the polarizing plate protective films of the respective examples was subjected to saponification, and the other film was set to a film in which FUJITEC TD60UL was subjected to saponification.

In all of the polarizing plate protective films of the respective examples, bonding properties with respect to polyvinyl alcohol were sufficient, and polarizing plate processing aptitude was excellent.

(Display Performance Evaluation in IPS Type Liquid Crystal Display Device)

Polarizing Plates interposing a liquid crystal cell therebetween were detached from a commercially available liquid crystal television (a slim 42 type liquid crystal television in an IPS mode), and the polarizing plates prepared as described above were rebonded to the liquid crystal cell through an pressure sensitive adhesive agent such that the polarizing plate protective film side of each of the examples was arranged on the liquid crystal cell side. The assembled liquid crystal television was retained in an environment of a temperature of 50° C. and relative humidity of 80% for 3 days, and then, was moved into an environment of a temperature of 25° C. and relative humidity of 60%, lighting was continuously performed in a black display state, and visual observation was performed after 48 hours, and light unevenness was evaluated.

Brightness unevenness at the time of black display in a case of being observed from the front surface of the device was observed, and thus, it was found that unevenness was rarely observed under an environment of irradiance of 100 lx.

EXPLANATION OF REFERENCES

20: film manufacturing line
21: stock tank
22: dope composition
30: filtration device
31: casting die
32, 33: rotating roller
34: casting band
35: tenter type drier
40: selvage cutting device
41: drying chamber
42: cooling chamber
43: winding chamber
60: motor
61: stirrer
63: heat medium circulation device
64: casting quality
65: temperature adjustment equipment
66: condenser
67: collecting device
68: decompression chamber
69: casting film
70, 71, 72, 73: blowing port
74: web
80: crossover portion
81: blowing machine
82: film
90: crusher
91: roller
92: adsorption collecting device
93: forced static elimination device (static elimination bar)
94: knurling applying roller
95: winding roller
96: press roller

What is claimed is:

1. A polarizing plate protective film, containing:
    an acrylic resin,
    wherein the acrylic resin includes a methyl methacrylate unit a,
    a mass fraction of an alkyl (meth)acrylate unit b other than methyl methacrylate is less than 5 mass %,
    a weight average molecular weight is 250,000 to 4,000, 000, and
    a weight decreasing amount at the time of being heated at 140° C. for 1 hour is less than or equal to 0.5%.

2. The polarizing plate protective film according to claim 1,
    wherein the acrylic resin is formed of an alkyl (meth) acrylate unit, and a mass fraction of the methyl methacrylate unit a is greater than or equal to 95 mass %.

3. The polarizing plate protective film according to claim 1,
wherein the number of times of folding endurance which is measured on the basis of JIS P8115 in conditions of a load of 100 g is greater than or equal to 30 times in both of a longitudinal direction and a width direction of a film.

4. The polarizing plate protective film according to claim 1,
wherein the weight average molecular weight of the acrylic resin is 600,000 to 4,000,000.

5. The polarizing plate protective film according to claim 1,
wherein the weight decreasing amount at the time of being heated at 140° C. for 1 hour is less than or equal to 0.2%.

6. A dope composition, containing:
an acrylic resin,
wherein the acrylic resin includes a methyl methacrylate unit a,
a mass fraction of an alkyl (meth)acrylate unit b other than methyl methacrylate is less than 5 mass %,
a weight average molecular weight is 250,000 to 4,000,000, and
a weight decreasing amount at the time of being heated at 140° C. for 1 hour is less than or equal to 0.5%.

7. The dope composition according to claim 6,
wherein the acrylic resin is formed of an alkyl (meth)acrylate unit, and
a mass fraction of the methyl methacrylate unit a is greater than or equal to 95 mass %.

8. The dope composition according to claim 7,
wherein the weight average molecular weight of the acrylic resin is 600,000 to 4,000,000.

9. A method for manufacturing a polarizing plate protective film, comprising:
a film forming step of forming a film by casting a solution in which an acrylic resin is dissolved in a solvent onto a support and by drying the solution, and of peeling off the film;
a first stretching step of stretching the film in a longitudinal direction; and
a second stretching step of stretching the film in a width direction,
wherein the acrylic resin includes a methyl methacrylate unit a,
a mass fraction of an alkyl (meth)acrylate unit b other than methyl methacrylate is less than 5 mass %,
a weight average molecular weight is 250,000 to 4,000,000,
a weight decreasing amount at the time of being heated at 140° C. for 1 hour is less than or equal to 0.5%002C
when a residual volatile content of the film is set to A1 and a surface temperature of the film is set to T1 in the first stretching step, and a residual volatile content of the film is set to A2 and a surface temperature of the film is set to T2 in the second stretching step, conditions of Expressions (1) and (2) described below are satisfied, and
unit of A1 and A2 is %, and unit of T1 and T2 is ° C.

$$T1 \leq 170 - 2.8A1 \qquad \text{Expression (1)}$$

$$T2 \leq 170 - 2.8A2. \qquad \text{Expression (2)}$$

10. The method for manufacturing a polarizing plate protective film according to claim 9,
wherein the residual volatile content A1 of the film and the surface temperature T1 of the film in the first stretching step satisfy conditions of Expression (3) described below,
the residual volatile content A2 of the film and the surface temperature T2 of the film in the second stretching step satisfy conditions of Expression (4) described below, and
the unit of A1 and A2 is %, and the unit of T1 and T2 is ° C.

$$100 - 3.2A1 \leq T1 \qquad \text{Expression (3)}$$

$$100 - 3.2A2 \leq T2. \qquad \text{Expression (4)}$$

11. The method for manufacturing a polarizing plate protective film according to claim 9,
wherein both of a stretching ratio in the first stretching step and a stretching ratio in the second stretching step are 130% to 180%.

12. The method for manufacturing a polarizing plate protective film according to claim 9,
wherein the residual volatile content of the film in the first stretching step is 10% to 30%, and
the residual volatile content of the film in the second stretching step is less than or equal to 10%.

13. A polarizing plate, comprising:
the polarizing plate protective film according to claim 1.

14. A liquid crystal display device, comprising:
the polarizing plate according to claim 13.

* * * * *